(12) United States Patent
Salett et al.

(10) Patent No.: US 7,463,625 B2
(45) Date of Patent: Dec. 9, 2008

(54) STACKABLE SWITCH PORT COLLAPSE MECHANISM

(75) Inventors: Ronald M. Salett, Framingham, MA (US); Nicholas Ilyadis, Pepperell, MA (US); David B. Fite, Jr., Northborough, MA (US)

(73) Assignee: Nortel Networks Limited, St. Laurent Quebec (CA)

( * ) Notice: Subject to any disclaimer, the term of this patent is extended or adjusted under 35 U.S.C. 154(b) by 986 days.

(21) Appl. No.: 10/230,758

(22) Filed: Aug. 29, 2002

(65) Prior Publication Data

US 2003/0058856 A1 Mar. 27, 2003

Related U.S. Application Data

(63) Continuation of application No. 09/107,177, filed on Jun. 29, 1998, now Pat. No. 6,490,276.

(51) Int. Cl.
*H04Q 11/00* (2006.01)
(52) U.S. Cl. .................... 370/360; 370/389; 370/395.2; 370/395.3; 370/397; 370/401
(58) Field of Classification Search ................. 370/254, 370/257, 258, 360, 397, 389, 400, 401, 402, 370/432, 465, 395.2, 395.3, 396, 362, 363, 370/395.5
See application file for complete search history.

(56) References Cited

U.S. PATENT DOCUMENTS

| | | | | |
|---|---|---|---|---|
| 5,440,563 A | * | 8/1995 | Isidoro et al. ................ | 370/270 |
| 5,623,489 A | * | 4/1997 | Cotton et al. ................ | 370/381 |
| 5,740,534 A | | 4/1998 | Ayerst et al. ............. | 455/186.1 |
| 5,974,467 A | * | 10/1999 | Haddock et al. ............ | 709/240 |
| 6,041,057 A | | 3/2000 | Stone ......................... | 370/397 |
| 6,108,345 A | | 8/2000 | Zhang ......................... | 370/445 |
| 6,108,782 A | * | 8/2000 | Fletcher et al. ............. | 713/153 |
| 6,128,296 A | * | 10/2000 | Daruwalla et al. .......... | 370/389 |
| 6,157,623 A | * | 12/2000 | Kerstein ..................... | 370/315 |
| 6,249,528 B1 | * | 6/2001 | Kothary ..................... | 370/466 |
| 6,363,081 B1 | * | 3/2002 | Gase ........................... | 370/466 |
| 6,510,461 B1 | * | 1/2003 | Nielsen ...................... | 709/224 |
| 6,519,226 B1 | * | 2/2003 | Kumar et al. ................ | 370/230 |

* cited by examiner

*Primary Examiner*—Chi H. Pham
*Assistant Examiner*—Shick Hom
(74) *Attorney, Agent, or Firm*—Blakely Sokoloff Taylor & Zafman, LLP

(57) ABSTRACT

A method and apparatus for providing data communication between stations on a network which optimizes the amount of resources required for a network switch. A first data frame is encoded with a source station identifier for the first station and a source switch identifier for the first switch. The first data frame is sent from the first switch to the second switch. A station list in the second switch is updated to indicate that the first station is associated with the first switch. Subsequent data frames having the same destination as the first switch are sent directly to the second switch. Any switch on the network need only identify the local ports attached to the switch, plus the number of switches on the network. The task of identifying all of the ports on the network is distributed across all switches on the network.

16 Claims, 4 Drawing Sheets

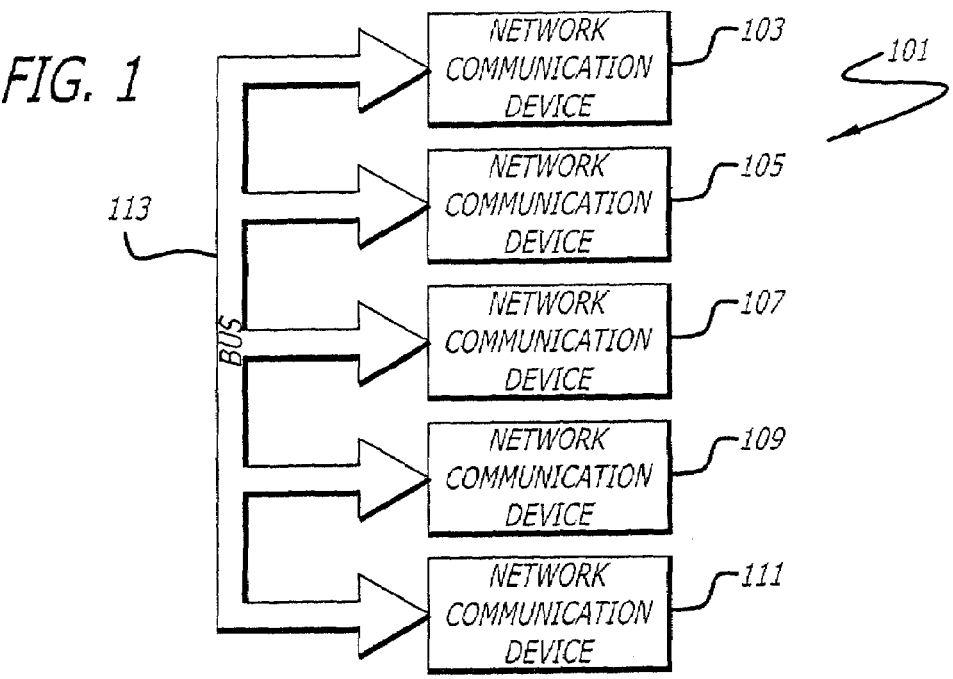

FIG. 1

| MEMORY SPACE | 64 BITS | NUMBER OF ENTRIES |
|---|---|---|
| 4K | VLAN Masks (All Else) | 4K |
| 4K | VLAN Masks (Unknown Multicast) | 4K |
| 8K | FORWARD/FILTER/TRUNK Masks | 4K/2K/1K* |
| 48K | Address Entries | 32K |

\* = BASED ON NUMBER OF TRUNK GROUPS SUPPORTED

FIG. 5

CAM ENTRY DATA

| DATA | NUMBER OF BITS |
|---|---|
| MAC ADDRESS | 48 |
| VLAN TAG | 12 |
| FID | 1 |
| POLICY | 13 |
| SOURCE PORT | 6 |
| TRUNK MASK GROUP | 4 |
| SSA | 1 |
| DSA | 1 |
| LOSS SENSITIVE | 1 |
| MIGRATE LOCKED | 1 |
| VALID/SEEN | 2 |
| DA BASED | 1 |
| RX_DIS_OV | 1 |
| UPA | 1 |
| FILTERED | 1 |

FIG. 6

| BIT # | NAME | BIT # | NAME |
|---|---|---|---|
| 63 | VAL | 31 | PORT31 |
| 62 | RESERVED | 30 | PORT30 |
| 61 | RXSN | 29 | PORT29 |
| 60 | TXSN | 28 | PORT28 |
| 59 | FLD | 27 | PORT27 |
| 58 | LCL | 26 | PORT26 |
| 57 | UPA | 25 | PORT25 |
| 56 | LOSS_SNSTV | 24 | PORT24 |
| 55 | COL_PORT7 | 23 | PORT23 |
| 54 | COL_PORT6 | 22 | PORT22 |
| 53 | COL_PORT5 | 21 | PORT21 |
| 52 | COL_PORT4 | 20 | PORT20 |
| 51 | COL_PORT3 | 19 | PORT19 |
| 50 | COL_PORT2 | 18 | PORT18 |
| 49 | COL_PORT1 | 17 | PORT17 |
| 48 | COL_PORT0 | 16 | PORT16 |
| 47 | PORT47 | 15 | PORT15 |
| 46 | PORT46 | 14 | PORT14 |
| 45 | PORT45 | 13 | PORT13 |
| 44 | PORT44 | 12 | PORT12 |
| 43 | PORT43 | 11 | PORT11 |
| 42 | PORT42 | 10 | PORT10 |
| 41 | PORT41 | 9 | PORT9 |
| 40 | PORT40 | 8 | PORT8 |
| 39 | PORT39 | 7 | PORT7 |
| 38 | PORT38 | 6 | PORT6 |
| 37 | PORT37 | 5 | PORT5 |
| 36 | PORT36 | 4 | PORT4 |
| 35 | PORT35 | 3 | PORT3 |
| 34 | PORT34 | 2 | PORT2 |
| 33 | PORT33 | 1 | PORT1 |
| 32 | PORT32 | 0 | PORT0 |

FIG. 3

| BIT # | NAME | | BIT # | NAME |
|---|---|---|---|---|
| 63 | STR# | | 31 | TCI_PRIORITY2 |
| 62 | RESERVED | | 30 | TCI_PRIORITY1 |
| 61 | TXSN | | 29 | TCI_PRIORITY0 |
| 60 | RXSN | | 28 | TCI_CFI |
| 59 | RCV_TAGGED | | 27 | TCI_VID11 |
| 58 | RCV_VID_0 | | 26 | TCI_VID10 |
| 57 | FCS_PRES | | 25 | TCI_VID9 |
| 56 | DM | | 24 | TCI_VID8 |
| 55 | DST_PORT5 | FDI | 23 | TCI_VID7 |
| 54 | DST_PORT4 | MSE | 22 | TCI_VID6 |
| 53 | DST_PORT3 | TBE | 21 | TCI_VID5 |
| 52 | DST_PORT2 | TSE | 20 | TCI_VID4 |
| 51 | DST_PORT1 | FCE | 19 | TCI_VID3 |
| 50 | DST_PORT0 | ALE | 18 | TCI_VID2 |
| 49 | SRC_PORT5 | | 17 | TCI_VID1 |
| 48 | SRC_PORT4 | | 16 | TCI_VID0 |
| 47 | SRC_PORT3 | | 15 | ST_MASK7 |
| 46 | SRC_PORT2 | | 14 | ST_MASK6 |
| 45 | SRC_PORT1 | | 13 | ST_MASK5 |
| 44 | SRC_PORT0 | | 12 | ST_MASK4 |
| 43 | BLK | | 11 | ST_MASK3 |
| 42 | LEN10 | | 10 | ST_MASK2 |
| 41 | LEN9 | | 9 | ST_MASK1 |
| 40 | LEN8 | | 8 | ST_MASK0 |
| 39 | LEN7 | | 7 | RCV_DISCARD |
| 38 | LEN6 | | 6 | TAC_INHIBIT |
| 37 | LEN5 | | 5 | TRN_PORT5 |
| 36 | LEN4 | | 4 | TRN_PORT4 |
| 35 | LEN3 | | 3 | TRN_PORT3 |
| 34 | LEN2 | | 2 | TRN_PORT2 |
| 33 | LEN1 | | 1 | TRN_PORT1 |
| 32 | LEN0 | | 0 | TRN_PORT0 |

FIG. 4

STACKABLE SWITCH PORT COLLAPSE MECHANISM

CROSS-REFERENCE TO RELATED APPLICATIONS

This is a continuation of U.S. patent application (application Ser. No. 09/107,177) filed Jun. 29, 1998, which has now matured to U.S. Pat. No. 6,490,276.

FIELD OF THE INVENTION

This invention relates generally to data communications networks, and more particularly, to a method and apparatus for encoding a station identifier and switch identifier which optimizes the amount of resources required for a network switch.

BACKGROUND OF THE INVENTION

Computer networks are used to interconnect many computing resources, including computers, workstations, servers, printers, modems, and storage devices. For example, two or more computers may be connected together through a network. Network users are able to share files, printers and other resources, send messages and run applications on remote computers. An important part of any computer network includes the physical components or network communications devices used to interconnect the computing resources.

One network communications device used to interconnect multiple computing resources is a chassis-based system designed to accommodate a number of internal cards. The computing resources such as computers are coupled to the internal cards of the chassis-based system. Once the computers are coupled to the internal cards, the computers are coupled to the network. To accommodate network growth, additional internal cards may be purchased and added to the chassis-based system. With the additional internal cards installed, additional computing resources may be added to the network. A disadvantage of these chassis-based systems is that there is a relatively large initial investment when purchasing the chassis because of the large amount of overhead associated with chassis-based systems.

An alternative to expensive chassis-based systems is the use of less expensive standalone network communications devices or units that have a fixed number of ports for connecting computing resources or stations to the network. Such standalone network communications devices include stackable switches or the like. Although additional ports can not be added to each individual standalone unit, separate standalone units can be stacked, cascaded or coupled to accommodate network growth. As a result, there is a lower startup cost when establishing a computer network with the standalone units in comparison with chassis-based systems. Furthermore, network administrators still have the flexibility to increase the size of the network with the less-expensive standalone units.

FIG. 1 illustrates multiple network communications devices 103, 105, 107, 109 and 111 coupled together to form a computer network 101. Multiple computing resources (not shown) are coupled to each network communications device 103, 105, 107, 109 and 111. In one embodiment, network communications devices 103, 105, 107, 109 and 111 are stackable switches coupled together through bus 113. Bus 113 is used to tie together the switch network fabric of computer network 101. It will be noted by one of ordinary skill in the art that the utilization of bus 113 is an extension of the chassis-based designs discussed earlier. The internal cards of the chassis-based systems are commonly coupled to high speed buses within the chassis-based systems.

While the use of stackable switches allows a network to be easily upgraded to accommodate additional ports, an important consideration is to keep the cost of each switch low. As additional switches and ports are added to the network, each switch on the network must contain a list of all other switches and ports. However, the memory required to store information on all ports on the network may become large, even for average sized networks. For example, in a network using stackable switches having 64 ports each, with a maximum total of eight switches, each switch would be required to store information for all 512 ports. Therefore, there is a need for a way to store port information which optimizes the amount of resources required for a network switch.

SUMMARY OF THE INVENTION

The present invention provides a method and apparatus for providing data communication between stations on a network which optimizes the amount of resources required for a network switch. A first data frame is encoded with a source station identifier for the first station and a source switch identifier for the first switch The first data frame is sent from the first switch to the second switch. A station list in the second switch is updated to indicate that the first station is associated with the first switch. Subsequent data frames having the same destination as the first switch are sent directly to the second switch. Any switch on the network need only identify the local ports attached to the switch, plus the number of switches on the network. The task of identifying all of the ports on the network is distributed across all switches on the network.

BRIEF DESCRIPTION OF THE DRAWINGS

The present invention is illustrated by way of example and may be better understood by referring to the following description in conjunction with the accompanying drawings, in which like references indicate similar elements and in which:

FIG. 1 shows a computer network coupled together with a bus architecture compatible with the present invention;

FIG. 3 shows a content addressable memory (CAM) cycle compatible with the present invention;

FIG. 4 shows a packet bus and stack header compatible with the present invention;

FIG. 5 shows a preferred CAM memory organization compatible with the present invention.

FIG. 6 is an exemplary list of CAM entry data.

DETAILED DESCRIPTION OF A PREFERRED EMBODIMENT OF THE PRESENT INVENTION

Figure 2:
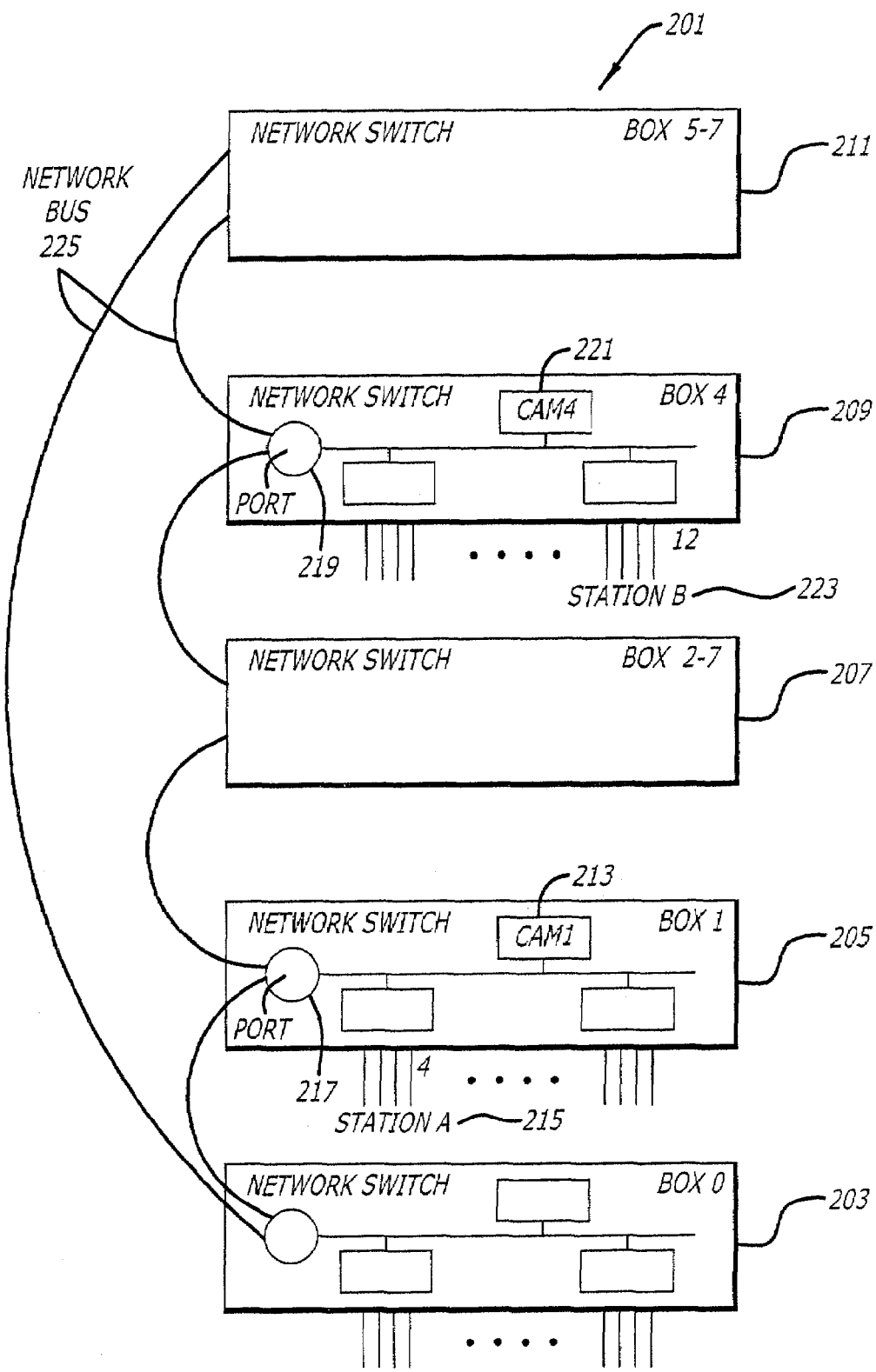
FIG. 2 shows a computer network with optimized stack memory compatible with the present invention.

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables a remote computer system user to execute a software application on a network file server.

The present invention provides a way to store port information which optimizes the amount of resources required for a network switch. Any switch on the network need only identify the local ports attached to the switch, plus the number of switches on the network. The task of identifying all of the ports on the network is distributed across all switches on the network.

Glossary

The following terms, phrases and definitions are used throughout the specification to describe a preferred embodiment of the present invention.

CAM—Content addressable memory.
CSMA/CD—Carrier sense multiple access collision detect.
DA—Destination address.
MAC—Media access control. The MAC address is that which matches either the DA or SA lookup. The same entry is used for both DA and SA though the remaining information in the entry is used in different ways.
Policy—Typically a 13-bit index used to access DA based policies for forwarding and filtering.
SA—Source address.
Source Port—The port number where an address was learned or migrated to. This is used for DA based forwarding.
SSA/DSA—Source and destination sniff bits to indicate that the addresses are to be tagged for MAC based sniffing.
TCP/IP—Transmission Control Protocol/Internet Protocol. A set of communication protocols developed by the U.S. Department of Defense that allows dissimilar computers to share information over a network.
Trunk Mask Group—Typically a four bit field that is accessed by the SA lookup to build an index to a trunk mask. This is used to provide SA based conditioning on a forwarding mask that has multiple trunk ports activated.
VLAN—Virtual local area network.
VLAN Tag—Virtual local area network tag. The VLAN tag originates from the packet an address was learned at. Each unique VLAN+SA creates a new CAM entry.

Hardware Environment

As shown in FIG. 2, an embodiment of the present invention shows how a network 201 having network switches 203, 205, 207, 209, and 211 are coupled with a network bus 225. These switches may be stacked, allowing ports to be readily added to the network. Each switch contains a content addressable memory (CAM) 213, 221 which is used to transfer data frames between a port and a switch or between switches, and to store port information and other network information. A data transfer port 217, 219, allows the transfer of information and data frames between network switches.

The present invention optimizes the memory of a network switch by storing only the port information associated with the switch and information about the other switches on the network. In one embodiment of the present invention, a 64-bit CAM cycle word is used to indicate the source and destination information for each port on a switch, as shown in the example in FIG. 3. Using a 64-bit word, it is possible to recognize, for example, the presence of 48 ports on the switch and eight switches total on the network. The lower 56 bits of the 64-bit CAM cycle word, shown as bits 0-55, are preferably used to indicate source or routing information for a data frame. The encoding is preferably in a vector form of 1 bit per port. The first 48 bits of the 64-bit CAM cycle word, shown as bits 0-47, are preferably used to indicate the presence of the ports, while the next eight bits, shown as bits 48-55, are preferably used to indicate the presence of up to eight switches. The remaining eight bits are used for other system and administrative purposes. The total number of ports available in a network using this mechanism is 48×8, or 384 ports.

The description of the present invention uses an example 64-bit CAM cycle word for illustration purposes only. It will be recognized that the number of ports recognizable on a switch and the maximum number of switches on a network may be increased or decreased by changing size of the CAM cycle word or changing the contents of the CAM cycle word without loss of compatibility with the present invention. It will also be recognized that the contents of the CAM cycle word may be reordered or rearranged without loss of compatibility with the present invention. For example, by using the first 40 bits to recognize ports and the next 16 bits to recognize switches, it is possible to have 40×16, or 640 ports on the network. In an additional example, by using a 128-bit CAM cycle word size, eight bits for administrative purposes, 104 bits for ports and 16 bits for switches, it is possible to have 104×16, or 1,664 ports on the network.

FIG. 4 shows a preferred packet bus and stack header which optimizes the memory of a network switch according to the present invention. In one embodiment of the present invention, a 64-bit header is used to indicate the source and destination information for each set of data frames transmitted on the network. The header preferably provides six bits for the source port (SRC_PORT), shown as bits 44-49, and six bits for the destination port (DST_PORT), shown as bits 50-55.

The description of the present invention uses an example 64-bit packet bus and stack header word for illustration purposes only. It will be recognized that the number of ports recognizable on a switch and the maximum number of switches on a network may be increased or decreased by changing size of the packet bus and stack header word or changing the contents of the packet bus and stack header word without loss of compatibility with the present invention. It will also be recognized that the contents of the packet bus and stack header word may be reordered or rearranged without loss of compatibility with the present invention.

The operation of the present invention is illustrated by an example where station A 215 sends information to station B 223, as shown in FIG. 2. The network initially does not know which stations are associated with which ports or switches, and preferably must learn the associations as data frames are sent through the network, as described below. When station A 215 first transmits a data frame, it is received by switch 205 on port 4. The CAM 213 in switch 205 updates a station list contained in the CAM 213 to indicate that station A 215 is on port 4. For preferably only on the stack bus, the switch 205 then updates the header information of the data frame to indicate that it originated from switch 205. In one embodiment of the present invention, the SRC_PORT or local port bits of the packet bus and stack header of the data frame are encoded with the originating switch. Switch 205 also reads the destination station from the header information of the data frame, which in the present example is station B 223. Switch 205 compares the destination station of the data frame with its station list. If the data frame is the first data frame transmitted through the switch 205 which has station B 223 as a destination station, station B 223 will not be found in the station list of switch 205. Switch 205 then sends or "floods" the data frame out all ports on switch 205 and to all other switches on the network. Flooding is typically implemented by asserting all bits in the CAM cycle, including stack box bits, except for the source port bit.

Upon receiving the data frame, switch 209 and all other switches compare the source station of the data frame with its station list. If the data frame is the first data frame transmitted through the switch 209 which has station A 215 as a source station, station A 215 will not be found in the station list of switch 209. Switch 209 then updates the station list contained in the CAM 221 to indicate that station A 215 is on switch 205. Switch 209 also compares the destination station of the data frame with its station list. If the data frame is the first data frame transmitted through the switch 209 which has station B 223 as a destination station, or if station B 223 has not yet transmitted any data frames through switch 209, station B 223 will not be found in the station list of switch 209. Switch 209 then sends or "floods" the data frame out all ports on switch 209. Otherwise, switch 209 sends the data frame to the port associated with station B 223 in the station list of switch 209.

When station B 223 receives the data frame, station B 223 answers back with a response frame which has station A 215 as the destination station. Upon receiving the response frame, switch 209 updates the station list contained in switch 209 to indicate that station B 223 is on port 12. Switch 209 then updates the header information of the response frame to indicate that it originated from switch 209. In one embodiment of the present invention, the SRC_PORT bits of the packet bus and stack header of the response frame are encoded with the originating switch. Switch 209 also compares the destination station of the response frame with its station list. Upon finding that station A 215 is on switch 205, switch 209 transmits the response frame to switch 205. When switch 205 receives the response frame, switch 205 updates the station list contained in the CAM 213 to indicate that station B 223 is on switch 209.

The station list of any switch on the network can be updated with switch information for station A 215 and station B 223 in a manner similar to switches 205 and 209 above. This is possible in a broadcast or other similar type network where all data frames and response frames are received by all switches on the network.

When the station list for switches on the network have been updated with switch information for station A 215 and station B 223, all subsequent network communication with station A 215 and station B 223 proceeds directly in the following manner. Upon receiving a data frame, a network switch reads the header information of the data frame and compares the destination station of the data frame with its station list. If the switch is, for example, switch 205, and the destination station is, for example, 221, switch finds 221 in its station list as being associated with switch 209. Switch 205 then transmits the data frame to switch 209, which compares the destination station to its own station list and sends the data frame to station B 223 on port 12.

CAM Description

A preferred CAM is incorporated by an application specific integrated circuit (ASIC). It is responsible for providing forwarding decisions for all packets appearing on the Packet Bus II. The CAM operates by reading the packet header and DA/SA to formulate forwarding decisions. It also has some protocol/Layer 3 sensitivity as it can be used to do ARP filtering and IGMP report capture for the processor port.

As shown in FIG. 5, a preferred CAM utilizes the 64K×64 memory attached to the ASIC. Normally this memory is used for RX/TX buffers when the ASIC is in port mode but is redefined for use as a CAM. The CAM memory is subdivided into four sections: Address entries, a policy table containing Forwarding/Filtering/Trunk Masks and two sets of VLAN filter masks.

Address entries are comprised of 96 bits and are grouped by four into a hash bucket yielding 8K hash buckets. Each hash bucket is comprised of six 64-bit words that contain the address information for the four address that are contained within. The address entries are not contiguous—four partial addresses are contained in the first two words and the remaining locations contain specific information for each of the four addresses including the remainder of the address and its VLAN tag. Specifically, the address entries contain the following information: 48 bits address, 12 bit VLAN tag, 1 bit filtering database ID, 13 bit policy, 4 bit trunk group and various other control bits as shown in.

The data contained in a valid entry is used along with data from the Packet Bus header to provide a forwarding decision. The forwarding decision is used to build a CAM cycle on the Packet Bus to steer the packet to its egress port(s). FIG. 6 provides a list of CAM entry data.

TABLE 1

CAM Entry Data

| Data | Number of bits |
|---|---|
| MAC Address | 48 |
| VLAN tag | 12 |
| FID | 1 |
| Policy | 13 |
| Source Port | 6 |
| Trunk Mask Group | 4 |
| SSA | 1 |
| DSA | 1 |
| Loss Sensitive | 1 |
| Migrate Locked | 1 |
| Valid/Seen | 2 |
| DA Based | 1 |
| RX_DIS_OV | 1 |
| UPA | 1 |
| Filtered | 1 |

The fields and definitions of the CAM entry data shown in Table 1 are described in greater detail below.

MAC Address—This is the MAC address that matches either the DA or SA lookup. The same entry is used for both DA and SA though the remaining information in the entry is used in different ways.

VLAN Tag—VLAN tag from the packet the address was learned at. Each unique VLAN+SA creates a new CAM entry.

FID—Filtering Database Identification select. This bit indicates whether the 12 bit VLAN Tag field contains a VLAN ID or a zero packet six bit forwarding database ID.

Policy—A 13 bit index used to access DA based policies for forwarding and filtering.

Source Port—The port number where this address was learned or migrated to. This is used for DA based forwarding.

Trunk Mask Group—A four bit field that is accessed by the SA lookup to build an index to a trunk mask. This is used to provide SA based conditioning on a forwarding mask that has multiple trunk ports activated.

SSA/DSA—Source and Destination sniff bits to indicate that these addresses are to be tagged for MAC based sniffing.

Loss Sensitive—Indicates that this DA sets the Loss sensitive bit in the CAM header. This is used by the processor interface to receive packets into reserved high-priority queue entries.

Migrate Locked—Indicates that this address is locked and cannot be migrated and no information in the CAM entry is updated when it appears on a port other the one it was locked on.

Valid/Seen—These two bits are used to indicate valid addresses and whether they have been seen since the last aging scan.

DA Based—Indicates that this address should be forwarded without the use of a trunk mask, thus always sending it to the last port learned for this address.

RX_DIS_OV—Receive Discard Override. Indicates that this DA will override the receive discard that was indicated by the receive port.

UPA—Microprocessor Accept. Indicates that this DA should be sent to the microprocessor port (along with potentially being forwarded to a regular port).

Filtered—Indicates that the DA is filtered for this egress port based on static filtering information. This bit is updated from the filter mask every time it migrates.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. In a data communications network having a plurality of stackable, interconnected switches including a first switch and a second switch, a method of learning associations between stations, ports, and switches in the network, the method comprising:
   receiving a data frame from a first station on a first port of the first switch, the data frame having a second station as a destination;
   updating a station list in the first switch to indicate that the first station is on the first port;
   updating the data frame to indicate that it originated from the first switch;
   comparing the second station to the station list in the first switch;
   sending the data frame to all of a plurality of ports on the first switch and to all of the plurality of switches on the network if the second station is not found in the station list of the first switch;
   receiving a second data frame from a third switch, the second data frame being sent by a third station on a third port of the third switch and having a fourth station as a destination;
   updating the station list in the first switch to indicate that the third station is on the third switch;
   comparing the fourth station to the station list in the first switch;
   sending the second data frame to all of the plurality of ports on the first switch if the fourth station is not found in the station list of the first switch;
   receiving a second response frame from the fourth station, the fourth station being on a fourth port of the first switch, the response frame having the third station as a destination;
   updating the station list in the first switch to indicate that the fourth station is on the fourth port;
   updating the second response frame to indicate that it originated from the first switch; and
   sending the response frame to the third switch.

2. The method of claim 1 further comprising:
   receiving a response frame from the second station, the second station being on a second port of the second switch, the response frame having the first station as a destination and indicating that it originated from the second switch; and
   updating the station list in the first switch to indicate that the second station is on the second switch.

3. The method of claim 2 further comprising:
   sending the data frame to the second switch if the second station is found in the station list of the first switch with an indication that the second station is on the second switch.

4. The method of claim 1 further comprising:
   receiving a response frame from the second station, the second station being on a second port of the first switch; and
   updating the station list in the first switch to indicate that the second station is on the second port.

5. The method of claim 4 further comprising:
   sending the data frame to the second port on the first switch if the second station is found in the station list of the first switch with an indication that the second station is on the second port.

6. The method of claim 1 wherein the station list is stored in a content addressable memory (CAM).

7. A switch for use in a data communications network having a plurality of stackable, interconnected switches, the switch comprising:
   a plurality of ports including a first port to receive a data frame from a first station, the data frame having a second station as a destination, and a fourth port to transmit a second data frame to a fourth station, the second data frame having a third station as a source, the third station being on a third port of a third switch;
   a content addressable memory (CAM) that stores a station list;
   means for updating the station list to indicate that the first station is on the first port based on receipt of the data frame;
   means for updating the data frame to indicate that it originated from the switch;
   means for comparing the second station to the station list in the switch;
   means for sending the data frame to all of the plurality of ports on the switch and to all of the plurality of switches on the network if the second station is not found in the station list;
   means for updating the station list to indicate that the third station is on the third switch means for comparing the fourth station to the station list;
   means for sending the second data frame to all of the plurality of ports on the switch if the fourth station is not found in the station list;
   means for receiving a second response frame from the fourth station, the second response frame having the third station as a destination;
   means for updating the station list to indicate that the fourth station is on the fourth port;
   means for updating the second response frame to indicate that it originated from the switch; and
   means for sending the response frame to the third switch.

8. The switch of claim 7 further comprising:
   means for receiving a response frame from the second station, the second station being on a second port of a second switch, the response frame having the first station as a destination and indicating that it originated from the second switch; and
   means for updating the station list to indicate that the second station is on the second switch.

9. The switch of claim 8 further comprising:
   means for sending the data frame to the second switch if the second station is found in the station list of the switch with an indication that the second station is on the second switch.

10. The switch of claim 7 further comprising:
means for receiving a response frame from the second station, the second station being on a second port of the switch; and
means for updating the station list in the switch to indicate that the second station is on the second port.

11. The switch of claim 10 further comprising:
means for sending the data frame to the second port on the switch if the second station is found in the station list of the switch with an indication that the second station is on the second port.

12. A data communication network comprising a plurality of stackable, interconnected switches, each of the plurality of switches comprising:
a plurality of ports including a first port to receive a data frame from a first station, the data frame having a second station as a destination, and a fourth port to transmit a second data frame to a fourth station, the second data frame having a third station as a source, the third station being on a third port of a third switch;
a content addressable memory (CAM) that stores a station list;
means for updating the station list to indicate that the first station is on the first port based on receipt of the data frame;
means for updating the data frame to indicate that it originated from a first switch;
means for comparing the second station to the station list in the first switch;
means for sending the data frame to all of the plurality of ports on the first switch and to all of the plurality of switches on the network if the second station is not found in the station list;
means for receiving a response frame from the second station, the second station being on a second port of a second switch, the response frame having the first station as a destination and indicating that it originated from the second switch; and
means for updating the station list to indicate that the second station is on the second switch;
means for updating the station list to indicate that the third station is on the third switch;
means for comparing the fourth station to the station list;
means for sending the second data frame to all of the plurality of ports on the switch if the fourth station is not found in the station list;
means for receiving a second response frame from the fourth station, the second response frame having the third station as a destination;
means for updating the station list to indicate that the fourth station is on the fourth port;
means for updating the second response frame to indicate that it originated from the first switch; and
means for sending the response frame to the third switch.

13. The data communication network of claim 12, each of the plurality of switches further comprising:
means for receiving a response frame from the second station, the second station being on a second port of the second switch, the response frame having the first station as a destination and indicating that it originated from the second switch; and
means for updating the station list to indicate that the second station is on the second switch.

14. The data communication network of claim 13, each of the plurality of switches further comprising:
means for sending the data frame to the second switch if the second station is found in the station list of the first switch with an indication that the second station is on the second switch.

15. The data communication network of claim 12, each of the plurality of switches further comprising:
means for receiving a response frame from the second station, the second station being on a second port of the first switch; and
means for updating the station list in the first switch to indicate that the second station is on the second port.

16. The data communication network of claim 15, each of the plurality of switches further comprising:
means for sending the data frame to the second port on the first switch if the second station is found in the station list of the first switch with an indication that the second station is on the second port.

* * * * *